(12) United States Patent
Yoshizaki

(10) Patent No.: US 8,895,927 B2
(45) Date of Patent: Nov. 25, 2014

(54) DETECTION DEVICE, SENSOR DEVICE AND ELECTRONIC APPARATUS

(75) Inventor: Kei Yoshizaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 400 days.

(21) Appl. No.: 13/330,784

(22) Filed: Dec. 20, 2011

(65) Prior Publication Data
US 2012/0161007 A1 Jun. 28, 2012

(30) Foreign Application Priority Data
Dec. 24, 2010 (JP) ................... 2010-287182

(51) Int. Cl.
*G01J 5/00* (2006.01)
*G01J 5/34* (2006.01)
*G01J 5/58* (2006.01)

(52) U.S. Cl.
CPC .... *G01J 5/34* (2013.01); *G01J 5/58* (2013.01); *G01J 2005/0077* (2013.01)
USPC ...................................... 250/338.3

(58) Field of Classification Search
USPC .................................. 250/338.3
See application file for complete search history.

(56) References Cited

U.S. PATENT DOCUMENTS

| 3,842,276 | A | * | 10/1974 | Southgate ............... 250/336.1 |
| 3,877,308 | A | * | 4/1975 | Taylor .................... 307/400 |
| 4,024,560 | A | * | 5/1977 | Miller et al. ............. 257/252 |
| 5,021,660 | A | * | 6/1991 | Tomita et al. ........... 250/338.3 |
| 5,789,751 | A | * | 8/1998 | Ma ......................... 250/338.3 |
| 5,891,512 | A | * | 4/1999 | Kawata et al. ........... 427/74 |
| 2010/0181485 | A1 | * | 7/2010 | Legras ..................... 250/338.3 |
| 2011/0139989 | A1 | * | 6/2011 | Pawlak et al. ............ 250/340 |
| 2012/0091343 | A1 | * | 4/2012 | Repellin et al. .......... 250/338.4 |
| 2012/0161002 | A1 | | 6/2012 | Yoshizaki |

FOREIGN PATENT DOCUMENTS

JP 59-142427 A 8/1984
JP 61-045937 A 3/1986

* cited by examiner

*Primary Examiner* — Christine Sung
(74) *Attorney, Agent, or Firm* — Global IP Counselors, LLP

(57) ABSTRACT

A detection device includes a plurality of pyroelectric elements and a detection circuit. The pyroelectric elements includes a first pyroelectric element through an n-th pyroelectric element serially provided between a detection node and a first power supply node with n being an integer equal to or greater than 2. Each of the first pyroelectric element through the n-th pyroelectric element has a direction of polarization that is set to the same direction. The detection circuit is connected to the detection node.

19 Claims, 10 Drawing Sheets

DETECTION DEVICE, SENSOR DEVICE AND ELECTRONIC APPARATUS

CROSS-REFERENCE TO RELATED APPLICATIONS

This application claims priority to Japanese Patent Application No. 2010-287182 filed on Dec. 24, 2010. The entire disclosure of Japanese Patent Application No. 2010-287182 is hereby incorporated herein by reference.

BACKGROUND

1. Technical Field

The present invention relates to detection device, a sensor device, and an electronic apparatus or the like.

2. Related Art

A conventional infrared detection device is known which uses a pyroelectric element. A human body, for example, radiates infrared rays having a wavelength in the vicinity of 10 μm, and by detecting the infrared rays, the presence or temperature information of a human body can be detected without contact. Consequently, such an infrared detection circuit can be used to detect an intruder or measure a physical quantity.

The technique disclosed in Japanese Laid-Open Patent Application Publication No. 59-142427, for example, is known as a conventional technique for an infrared detection device. In the conventional technique disclosed in this publication, a chopper is used to vary the temperature of a pyroelectric element to generate a pyroelectric current while switching between irradiation and blocking of infrared rays to the pyroelectric element, and this pyroelectric current is charged into the pyroelectric element as such and thereby detected as a voltage signal.

However, since the relative permittivity of the ferroelectric body used in the pyroelectric element is extremely high in this conventional technique, the electrical capacitance of the pyroelectric element is necessarily large, and a large voltage signal cannot be retrieved. As a result, it is difficult to increase the sensitivity of the detection device.

SUMMARY

According to several embodiments of the present invention, it is possible to provide a detection device, a sensor device, and an electronic apparatus or a similar instrument.

A detection device according to one aspect of the present invention includes a plurality of pyroelectric elements and a detection circuit. The pyroelectric elements include a first pyroelectric element through an n-th pyroelectric element serially provided between a detection node and a first power supply node with n being an integer equal to or greater than 2. Each of the first pyroelectric element through the n-th pyroelectric element has a direction of polarization that is set to the same direction. The detection circuit is connected to the detection node.

According to the aspect of the present invention described above, n pyroelectric elements whose respective direction of polarization has been set to the same direction are serially connected, thereby making it possible to obtain, during infrared detection, a voltage signal that is n times greater than a voltage obtained from one pyroelectric element. As a result, the sensitivity of the detection device can be increased, the detection accuracy can be enhanced, and other benefits can be obtained without changing, e.g., the material used for, or the film thickness of, the pyroelectric element.

According to another aspect of the present invention, the detection device preferably further includes a poling circuit configured to perform a poling process, in which the direction of polarization of each of the first pyroelectric element through the n-th pyroelectric element is set to the same direction.

According to this aspect, it is possible to use the poling circuit to align the directions of polarization of n pyroelectric elements to an identical direction. As a result, it is possible to perform a poling process, e.g., during factory shipment or before use, and align the directions of polarization of n pyroelectric elements to an identical direction.

According to another aspect of the present invention, the poling circuit is preferably configured to apply, to a first connection node disposed at one end of the first pyroelectric element, a poling voltage for causing the first pyroelectric element through the n-th pyroelectric element to become polarized in the same direction.

According to this aspect, a poling voltage that has been divided is applied to each of the serially connected n pyroelectric elements, therefore making it possible to set the direction of polarization of n pyroelectric elements to an identical direction.

According to another aspect of the present invention, the poling circuit the poling circuit preferably includes a first switch element provided between a poling voltage supply node and the first connection node, and a second switch element provided between the first connection node and the detection node. The poling circuit is preferably configured to set the first switch element to an OFF state and the second switch element to an ON state during a detection period, and to set the first switch element to an ON state and the second switch element to an OFF state during a period of the poling process.

According to this aspect, during the detection period, a voltage signal from n pyroelectric elements can be inputted into the detection circuit in a state in which no poling voltage is being applied to the pyroelectric elements. In contrast, during the period of the poling process, the poling process can be performed on the pyroelectric elements in a state in which no poling voltage is being inputted into the detection circuit.

According to another aspect of the present invention, the detection device preferably further includes at least one additional pyroelectric element provided between the first connection node and the first power supply node, the additional pyroelectric element having a direction of polarization that is different from that of the first pyroelectric element through the n-th pyroelectric element.

According to this aspect, in an instance in which there is disturbance or change in ambient temperature, a pyroelectric current is generated in an opposite direction from the pyroelectric element that has a different direction of polarization, thereby making it possible to reduce an effect of the disturbance or the change in ambient temperature. As a result, it becomes possible to detect, e.g., infrared rays in a stable and highly accurate manner without being affected by disturbance or change in ambient temperature.

In another aspect of the present invention, the poling circuit preferably includes a poling monitor circuit configured to monitor whether or not the poling process has been performed in a normal manner.

According to this aspect, the poling process can be repeated in an instance in which the poling process has not been performed in a normal manner. Therefore, infrared rays can be detected in a highly reliable manner, and other benefits can be obtained.

In another aspect of the present invention, the detection device preferably further includes a shared support member supporting the first pyroelectric element through the n-th pyroelectric element, with the first pyroelectric element through the n-th pyroelectric element being formed on the shared support member.

Through this configuration, since n pyroelectric elements can be provided on the shared support member, the surface area of a single sensor can be reduced. As a result, sensor cells can be arranged at high density in a sensor array in which a plurality of sensor cells is arranged in an array.

In another aspect of the present invention, the detection device preferably includes a plurality of support members including a first support member through an n-th support member supporting the first pyroelectric element through the n-th pyroelectric element, respectively, with the first pyroelectric element through the n-th pyroelectric element being formed on the first support member through the n-th support member, respectively.

Through this configuration, since the surface area of each of the n support members can be reduced, the heat capacity of the pyroelectric elements can be reduced. As a result, it is possible to obtain such effects as increased sensitivity of infrared detection.

In another aspect of the present invention, the detection device preferably includes a shared cavity region shared between the first support member through the n-th support member, with the shared cavity region being provided below the first support member through the n-th support member.

Through this configuration, n pyroelectric elements and n shared support members can be thermally separated from a substrate by the shared cavity region. As a result, it is possible to obtain such effects as increased sensitivity of infrared detection.

In another aspect of the present invention, the detection device includes a plurality of cavity regions including a first cavity region through an n-th cavity region, respectively corresponding to the first support member through the n-th support member, with the first cavity region through the n-th cavity region being provided below the first support member through the n-th support member, respectively.

Through this configuration, the pyroelectric elements and the support members can be thermally separated from a substrate by the cavity regions. As a result, it is possible to obtain such effects as increased sensitivity of infrared detection.

Another aspect of the present invention relates to a sensor device comprising the detection device according to any of the aspects described above.

A sensor device according to another aspect of the present invention includes a sensor array, one or more row lines, one or more column lines, a row selection circuit and a read circuit. The sensor array has a plurality of sensor cells with each of the sensor cells including a plurality of pyroelectric elements, a detection circuit and a poling circuit. The pyroelectric elements include a first pyroelectric element through an n-th pyroelectric element serially provided between a detection node and a first power supply node with n being an integer equal to or greater than 2, each of the first pyroelectric element through the n-th pyroelectric element having a direction of polarization that is set to the same direction. The detection circuit is connected to the detection node. The poling circuit is configured to perform a poling process, in which the direction of polarization of each of the first pyroelectric element through the n-th pyroelectric element is set to the same direction. The row selection circuit is connected to the one or more row lines. The read circuit is connected to the one or more column lines.

According to this aspect of the present invention, serially connecting n pyroelectric elements having identical directions of polarization makes it possible to obtain a signal having a voltage level that is n times greater than that of a signal obtained from one pyroelectric element. As a result, it is possible to increase the detection sensitivity of the sensor device, therefore making it possible to obtain, e.g., a high-sensitivity infrared camera or a similar device.

Another aspect of the present invention relates to an electronic apparatus comprising the sensor device according to any of the aspects described above.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
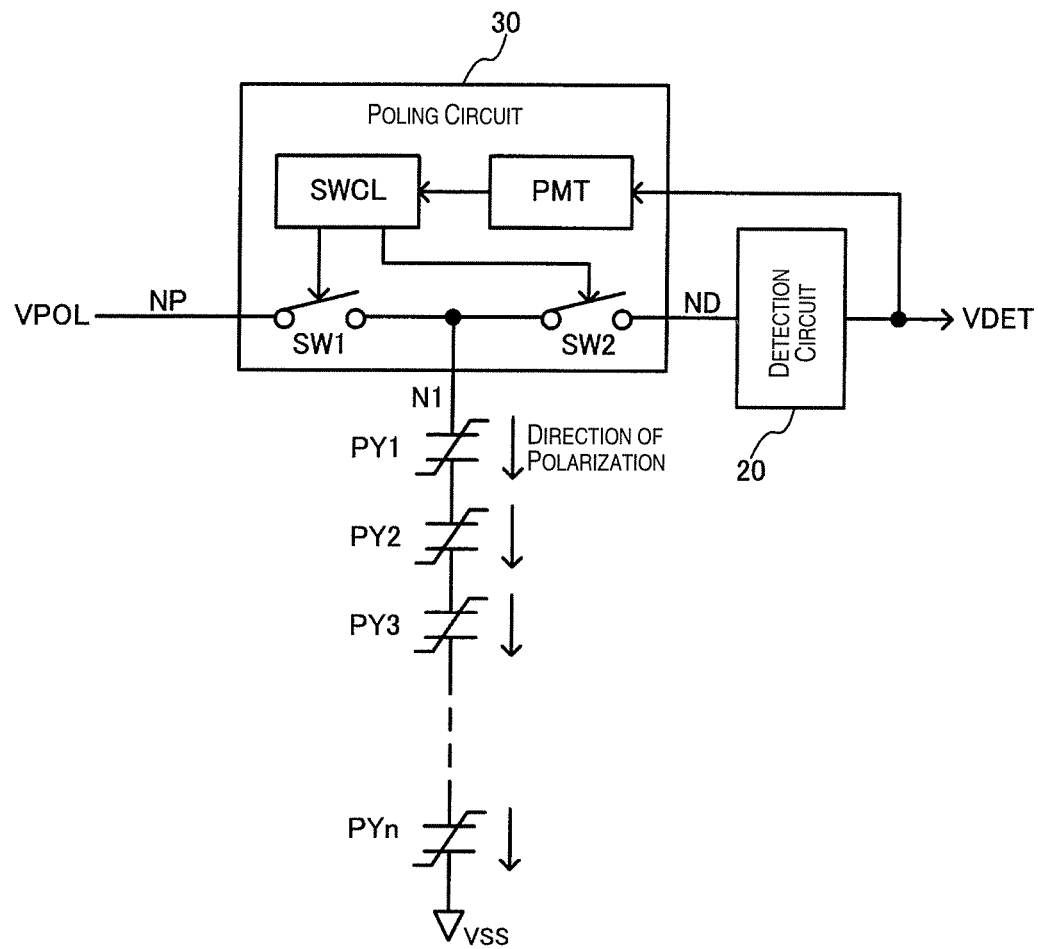
FIG. 1 is a basic example of the configuration of a detection device.

Preferred embodiments of the present invention will be described in detail. The embodiments described below do not unduly limit the scope of the present invention as recited in the claims, and it will be apparent to those skilled in the art that all of the configurations described in the embodiments are not necessarily essential means of achievement of the present invention.

1. Pyroelectric Element

In the detection device of the present embodiment, a pyroelectric element (thermal sensor element, infrared detection element, thermo-optical detection element, ferroelectric element) is used as an element for detecting infrared rays or the like. The pyroelectric element is an element which uses a lead zirconate titanate (PZT), for example, or other ferroelectric body, and utilizes a pyroelectric current generated by a change in temperature of the pyroelectric element to detect infrared rays.

Specifically, infrared rays radiated to the pyroelectric element are periodically interrupted by a chopper or the like to vary the temperature of the pyroelectric element and generate a pyroelectric current, and the pyroelectric current is charged into the pyroelectric element as such and thereby detected as a voltage signal. The larger this voltage signal is, the higher the sensitivity of the detection device can be, and the higher the detection precision that can be obtained. Conditions for increasing the detected voltage signal are described below.

The detected voltage signal $\Delta V$ is given by the equation (1) below, where Q is the total electric charge charged into the pyroelectric element by the pyroelectric current, and C is the electrical capacitance of the pyroelectric element.

$$\Delta V = Q/C \quad (1)$$

The total electric charge Q is given by the following equation (2), where $\Delta T$ is the temperature change of the pyroelectric element, p is the pyroelectric coefficient, and S is the surface area of the pyroelectric element.

$$Q = p \times S \times \Delta T \quad (2)$$

The electrical capacitance C of the pyroelectric element is given by the following equation (3), where $\epsilon$ is the relative permittivity of the ferroelectric body (pyroelectric body), $\epsilon 0$ is the permittivity in vacuum, and d is the thickness of the ferroelectric body.

$$C = \epsilon \times \epsilon 0 \times S/d \quad (3)$$

Based on the equations (1) through (3), the voltage signal $\Delta V$ is obtained as shown in the following equation (4).

$$\Delta V = p \times \Delta T \times d/(\epsilon \times \epsilon 0) \quad (4)$$

As is apparent from the equation (4), in order to increase the voltage signal $\Delta V$, the pyroelectric coefficient p, the temperature change $\Delta T$, and the thickness d of the ferroelectric body must be increased, and the relative permittivity $\epsilon$ of the ferroelectric body must be decreased.

The pyroelectric coefficient p corresponds to an amount of change in spontaneous polarization of a pyroelectric body relative to temperature change. The size of the pyroelectric coefficient is dependant on the material, and is substantially constant under a temperature equal to or less than the Curie point. For example, in the instance of lead zirconate titanate (PZT), the pyroelectric coefficient p is 50 nC/K/cm$^2$, which is an excellent value.

The temperature change $\Delta T$ is the temperature difference of the pyroelectric element before and after infrared reception. In order to increase the temperature change $\Delta T$, the heat capacity of the sensor as a whole that includes the pyroelectric element must be low to facilitate an increase in temperature of the pyroelectric element, and heat transfer between the sensor and the surrounding area must be suppressed. For example, a PZT thin film (about 100 nm) is formed to reduce the heat capacity, and a structure is used in which a sensor including a pyroelectric element is thermally separated by a MEMS technique.

As is apparent from the equation (4), a large thickness d for the ferroelectric body is preferred in order to increase the voltage signal $\Delta V$. However, when the thickness d is increased, problems arise in that the heat capacity of the sensor as a whole that includes the pyroelectric element increases.

The relative permittivity $\epsilon$ of the ferroelectric body is determined by the material, but in the case of PZT, for example, the relative permittivity of about 1000 leads to a large electrical capacitance C.

Thus, when the thickness d is reduced in an effort to reduce the heat capacity and increase the temperature change $\Delta T$, the electrical capacitance C increases. A large electrical capacitance C results in the inability to increase the voltage signal $\Delta V$. Conversely, when the thickness d is increased in order to decrease the electrical capacitance C, the heat capacity increases and the temperature change $\Delta T$ decreases. As a result, the voltage signal $\Delta V$ cannot be increased.

In the case of PZT, for example, the relative permittivity c can be reduced by such methods as changing the composition ratios of materials and optimizing the film formation process, but a marked reduction in relative permittivity is difficult to achieve. Polyvinylidene fluoride (PVDF) and other organic ferroelectrics can be cited as ferroelectric materials other than PZT which have low relative permittivity, but because of problems with reliability of these materials, and since the pyroelectric coefficients thereof are one or more orders of magnitude lower than that of PZT, adequate performance cannot be anticipated.

2. Detection Device

FIG. 1 shows an example of the basic configuration of the detection device of the present embodiment. The detection device of the present embodiment includes first through n-th (where n is an integer equal to 2 or greater) pyroelectric elements PY1 through PYn, a detection circuit 20, and a poling circuit 30. The detection device of the present embodiment is not limited to the configuration shown in FIG. 1, and it will be apparent to those skilled in the art that various modifications thereof are possible, such as omitting some elements, replacing some elements with other elements, or adding other elements.

The first through n-th pyroelectric elements PY1 through PYn are provided in series between a detection node ND and a first power supply node VSS. The polarization directions of the first through n-th pyroelectric elements PY1 through PYn are set to be the same direction as discussed in more detail below.

The detection circuit 20 is connected to the detection node ND, and detects a voltage signal which is based on a pyroelectric current of the first through n-th pyroelectric elements PY1 through PYn, and outputs a detection signal VDET. The configuration of the detection circuit 20 is described hereinafter.

The poling circuit 30 performs a poling process, in which the direction of polarization of each of the first through n-th pyroelectric elements PY1 through PYn is set to the same direction. Specifically, the poling circuit 30 applies a poling voltage VPOL, for causing the first through n-th pyroelectric elements PY1 through PYn to become polarized in the same direction, onto the first connection node N1, which is a node at one end of the first pyroelectric element PY1.

More specifically, the poling circuit 30 includes a first switch element SW1 provided between a poling voltage supply node NP and the first connection node N1, and a second switch element SW2 provided between the first connection node N1 and the detection node ND. The poling circuit 30 also includes a switch control circuit SWCL for controlling the first and second switch elements.

During a detection period, which is a period in which infrared rays are to be detected, the poling circuit 30 sets the first switch element SW1 to an OFF state, and sets the second switch element SW2 to an ON state. A voltage signal, based on the pyroelectric current generated by the first through n-th pyroelectric elements PY1 through PYn, is thereby inputted into the detection circuit 20 through the second switch element SW2 during the detection period.

During a period of the poling process, the poling circuit 30 sets the first switch element SW1 to an ON state, and sets the second switch element SW2 to an OFF state. A poling voltage VPOL, which causes the first through n-th pyroelectric elements PY1 through PYn, to become polarized in the same direction, is thereby applied on the first connection node N1 via the first switch element SW1 during the poling processing period. A poling voltage that has been divided (e.g., a voltage represented by VPOL/n) is applied to each of the first through n-th pyroelectric elements PY1 through PYn, and this voltage sets the direction of polarization of each of the pyroelectric elements to an identical direction. In FIG. 1, the direction of polarization of each of the pyroelectric elements is shown by an arrow. In FIG. 1, the arrows are shown pointing downwards. This direction of polarization is one in which, in an instance where an electrode nearer the detection node ND is an upper electrode and an electrode nearer the first power supply node VSS is a lower electrode for each of the pyroelectric elements, a negative (−) polarization charge is generated on the upper-electrode side and a positive (+) polarization charge is generated on the lower-electrode side.

The poling process may be performed, e.g., during factory shipment, or may be performed by the user before use.

As shown in FIG. 1, in a detection device according to the present embodiment, n pyroelectric elements PY1 through PYn are connected in series. The total capacitance $C_{tot}$ of the pyroelectric elements in such an instance is given by the following equation (5).

$$C_{tot} = C/n \quad (5)$$

Here, C represents the capacitance of a single pyroelectric element.

Therefore, a voltage signal $\Delta V_{tot}$ generated when n pyroelectric elements are connected in series is expressed as in the following equation (6).

$$\Delta V_{tot} = n \times (p \times \Delta T \times d / (\varepsilon \times \varepsilon 0)) \quad (6)$$
$$= n \times \Delta V$$

Thus, serially connecting n pyroelectric elements having identical directions of polarization makes it possible to obtain a voltage signal that is n times greater than a voltage signal $\Delta V$ obtained from a single pyroelectric element.

In the detection device according to the present embodiment, the poling circuit 30 may also include a poling monitor circuit PMT. The poling monitor circuit PMT monitors whether or not the poling process has been performed in a normal manner. Specifically, during a poling monitoring period, the poling monitor circuit PMT uses the switch control circuit SWCL to set the first switch element SW1 to an OFF state and the second switch element SW2 to an ON state, and monitors, based on results of detection by the detection circuit 20, whether or not the poling process has been performed in a normal manner. Specifically, the poling monitor circuit PMT determines whether or not a detection signal VDET from the detection circuit 20 is equal to a predetermined voltage, and thereby monitors whether or not the poling process has been performed in a normal manner. In an instance in which the poling process has not been performed in a normal manner, the poling process can be repeated.

Figure 2:
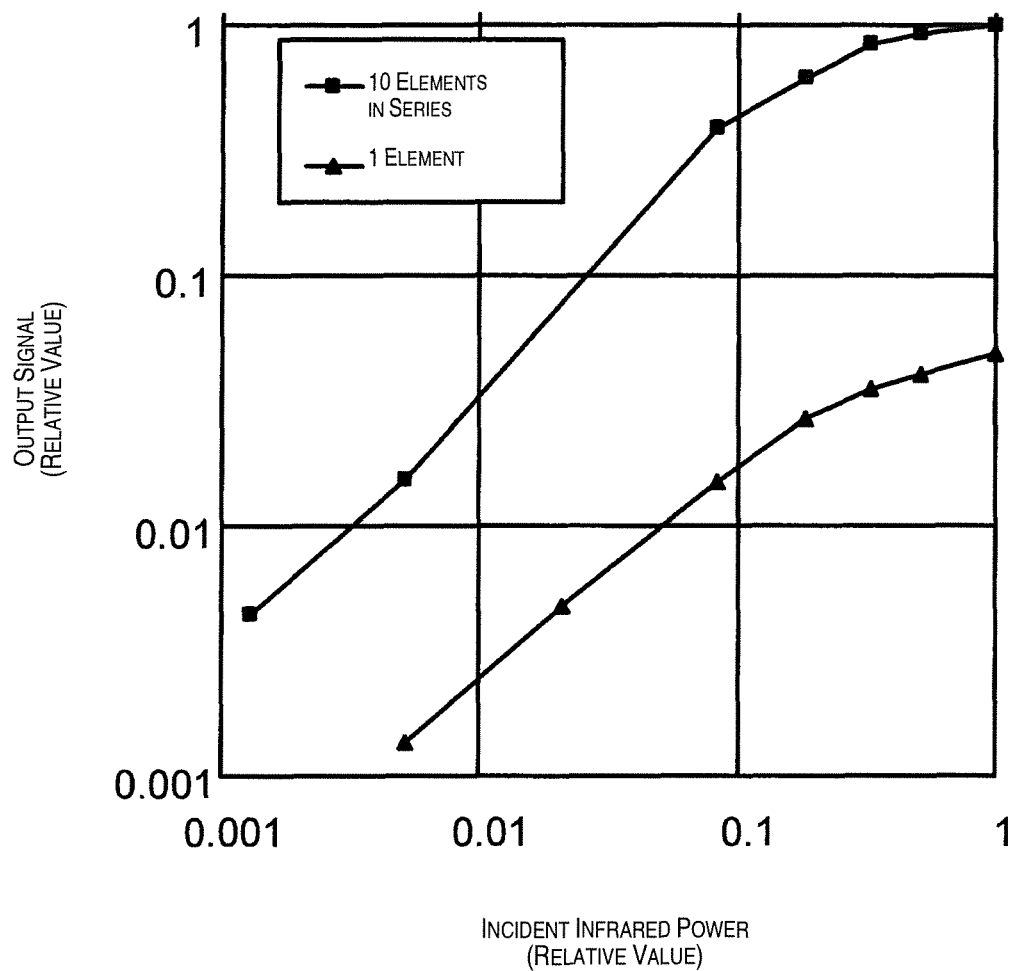
FIG. 2 is a graph showing a relationship between the power of incident infrared rays and an output signal.

FIG. 2 is a graph showing a relationship between the power of incident infrared rays and an output signal (voltage signal). FIG. 2 shows an instance in which ten pyroelectric elements are serially connected, and an instance in which one pyroelectric element is used. As can be seen from FIG. 2, the output signal in the instance in which ten pyroelectric elements are serially connected is approximately ten times greater than that in an instance involving one pyroelectric element.

Thus, according to the detection device of the present embodiment, serially connecting n pyroelectric elements having identical directions of polarization makes it possible to obtain an output signal that is n times greater than an output signal that can be obtained from one pyroelectric element. As a result, the sensitivity of the detection device can be increased, and the detection accuracy can be enhanced, without changing the material used for, or the film thickness of, the pyroelectric body (ferroelectric body).

3. Detection Circuit

Figure 3A:
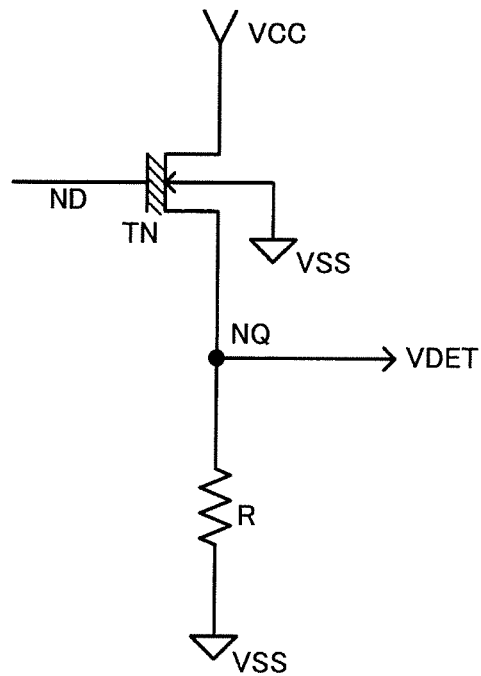
FIGS. 3A and 3B are first and second examples of the configuration of a detection circuit.
Figure 3B:
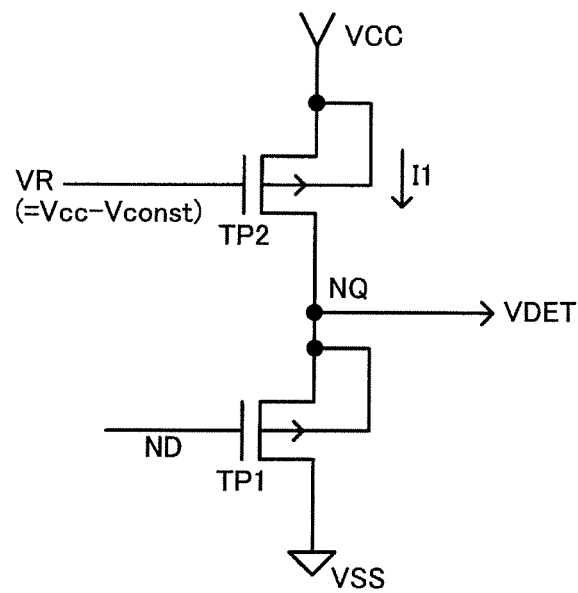

FIGS. 3A and 3B show first and second examples of the configuration of the detection circuit 20 used in the detection device according to the present embodiment. It will be apparent to those skilled in the art that the detection circuit 20 of the present embodiment is not limited to the configurations shown in FIGS. 3A and 3B, and a variety of modifications are possible, such as omitting some of the elements, replacing some of the elements with other elements, or adding other elements.

The first configuration example shown in FIG. 3A includes an N-type depletion transistor TN and a resistor R. The N-type depletion transistor TN and the resistor R are provided in series between a second power supply node VCC (high-potential-side power supply node) and a first power supply node VSS (low-potential-side power supply node), and constitute a source follower circuit.

The voltage signal $\Delta V$ from a pyroelectric element is inputted to the gate (detection node ND) of the N-type transistor TN, and the source of the N-type transistor TN is connected to one end of the resistor R. The transistor TN and the resistor R constitute a source follower circuit, and the gain thereof is substantially 1. A detection signal VDET (output voltage) that varies with the voltage signal $\Delta V$ is outputted from an output node NQ which corresponds to the source of the N-type transistor TN.

The detection circuit of the first configuration example has the drawback of being easily affected by manufacturing variation. Manufacturing variation includes, for example, variation of the current feed capability of the transistor TN, threshold value variation, shape variation, variation of the sheet resistance of the resistor R, variation of the shape of the resistor R, and other variation. Variation of the characteristics of a resistor manufactured on an IC substrate is generally greater than the variation of the characteristics of a transistor. Fluctuation of resistor characteristics that depends on fluctuation in manufacturing conditions, and fluctuation of transistor characteristics are also not associated with each other. The detection signal VDET of the detection circuit of the first configuration example therefore varies significantly.

Also, in order for the source follower circuit, which comprises the transistor TN and the resistance R, to operate, it is necessary for the transistor TN to be placed in an "on" state in a stable manner. The gate voltage of the transistor TN is substantially 0 V. Therefore, in order for the transistor TN to be placed in an "on" state, a design is necessary so that the source voltage of the transistor TN, i.e., the output voltage VDET of the detection circuit is sufficiently lower than the absolute value of the threshold value of the transistor TN.

In an instance in which a sensor array is formed on an IC substrate, an A/D converter or an amplification circuit that receives the output of the detection circuit is designed as a small-scale circuit that is connected to a GND terminal that has an identical electrical potential as a GND terminal (VSS terminal) of the detection circuit by a CMOS process. In such an instance, if the input voltage for such circuits approaches 0 V (i.e., the electrical potential of the GND terminal), problems are presented in that, e.g., the circuits may become compromised in terms of performance, or non-operational.

The detection circuit according to the second example of the configuration shown in FIG. 3B is a circuit that makes it possible to resolve the problems described above, and includes a first P-type transistor TP1 and a second P-type transistor TP2 that are serially provided between a second power supply node VCC and a first power supply node VSS. The first and second P-type transistors TP1, TP2 form the source follower circuit. Specifically, a voltage with an amplitude having a gain of substantially 1 is outputted as a detection signal VDET (output voltage) in response to small changes in the signal amplitude of the voltage signal ΔV from the pyroelectric element.

The first P-type transistor TP1 (P-type MOS transistor) is provided between the output node NQ and the first power supply node VSS (low-potential-side power supply node) of the detection circuit. In FIG. 3, for example, the source of the first P-type transistor TP1 is connected to the output node NQ, the drain is connected to the first power supply node VSS, and the voltage signal ΔV from the pyroelectric element is inputted to the gate.

The second P-type transistor TP2 (P-type MOS transistor) is provided between the second power supply node VCC (high-potential-side power supply node) and the output node NQ. In FIG. 3B, for example, the source of the second P-type transistor TP2 is connected to the second power supply node VCC, the drain is connected to the output node NQ, and the gate is set to a reference voltage VR=Vcc−Vconst. Here, Vcc is the voltage of the high-potential-side power supply VCC, and Vconst is a constant voltage (fixed voltage).

The substrate potential of the first P-type transistor TP1 is set to the potential of the source of the first P-type transistor TP1. In FIG. 3B, for example, the substrate potential of the first P-type transistor TP1 is connected to the output node NQ. The substrate potential of the second P-type transistor TP2 is set to the potential of the source of the second P-type transistor TP2. In FIG. 3B, for example, the substrate potential of the second P-type transistor TP2 is connected to the second power supply node VCC. By thus setting the substrate potentials of the P-type transistors TP2, TP2 to the source potential, fluctuation of the threshold voltages of the first P-type transistor TP1 and the second P-type transistor TP2 due to substrate bias effects can be prevented, and the threshold voltages of the first P-type transistor TP1 and the second P-type transistor TP2 can therefore be closer together. A modified configuration is also possible in which the substrate potentials of the P-type transistors TP1, TP2 are both set to the VCC potential.

At least one of the gate length and the gate width of the P-type transistors TP1 and TP2 is the same. More preferably, both the gate length and the gate width of the first P-type transistor TP1 and the second P-type transistor TP2 are the same. Through this configuration, the threshold voltage and other element characteristics of the P-type transistors TP1, TP2 can be brought closer together, and fluctuation of the detection signal VDET (output voltage) caused by manufacturing process fluctuation and other factors can be suppressed.

The operation of the detection circuit according to a second configuration example will next be described in further detail. As shown in FIG. 3B, the gate of the transistor TP2 is set to the reference voltage VR=Vcc−Vconst. Consequently, the gate-source voltage of the transistor TP2 is Vconst, and the second P-type transistor TP2 operates in a saturation region, and a current I1 determined almost solely by the gate-source voltage Vconst and the threshold voltage flows to the second P-type transistor TP2.

On the other hand, since the first P-type transistor TP1 is connected in series to the transistor TP2, the same current I1 flows to the first P-type transistor TP1. The substrate potential of the transistor TP1 is set to the source potential, the same as in the transistor TP2. Consequently, the threshold voltage of the transistor TP1 and the threshold voltage of the transistor TP2 can be equal. Furthermore, when the transistor TP1 operates in the saturation region, and the transistors TP1 and TP2 are assumed to have the same transistor size (same gate width and gate length), the gate-source voltage of the first P-type transistor TP1 is substantially the same as the gate-source voltage Vconst of the second P-type transistor TP2. Since the gate of the transistor TP1 is connected to the pyroelectric element, and the resistor of the pyroelectric element is present between the VSS and the detection node ND of the gate of the first P-type transistor TP1, the detection node ND is constantly set to 0 V (the VSS level). Consequently, the detection signal VDET of the output node NQ of the detection circuit, which is the source node of the transistor TP1, is constantly set to substantially the same voltage as Vconst.

When infrared rays are radiated to the pyroelectric element in this state and the temperature of the pyroelectric element changes, the resultant pyroelectric current transiently charges the gate (gate capacitance) of the transistor TP1, and the voltage fluctuates by ΔV. At this time, since the current I1 from the transistor TP2 flows to the transistor TP1, VDET, which is the source voltage of the TP1, is given by VDET=Vconst+ΔV. In other words, the circuit composed of the transistors TP1, TP2 operates as a source follower circuit in which the gain=1.

In the detection circuit according to the second configuration example configured as described above, in the case that Vcc is fed as the high-potential-side power supply voltage, the gate of the P-type transistor TP2 is set to the reference voltage VR=Vcc−Vconst. A voltage that changes with the voltage signal ΔV from the pyroelectric element is then outputted to the source of the P-type transistor TP1 on the basis of the set voltage corresponding to Vconst. For example, when the temperature of the pyroelectric element changes and the voltage from the pyroelectric element changes by ΔV from 0V, the output voltage VDET also changes by ΔV on the basis of the set voltage corresponding to Vconst. Here, the set voltage corresponding to Vconst may be Vconst as such or a voltage slightly different from Vconst.

The voltage Vconst is preferably set so that Vth≤Vconst≤Vcc−Vth, where Vth is the threshold voltage of the P-type transistor TP2 (TP1). In other words, a reference voltage VR=Vcc−Vconst which establishes such a relationship is inputted to the gate of the P-type transistor TP2. The transistors TP1, TP2 can thereby be made to operate in the saturation region. Since Vconst, which is the set voltage of the output voltage VDET, also becomes equal to or greater than the threshold voltage Vth, a voltage equal to or greater than the threshold voltage Vth can be constantly inputted to an amplification circuit or A/D converter of a subsequent stage. Consequently, the amplification circuit or A/D converter of a subsequent stage can be more easily designed, and compact and simple circuits can be used for the amplification circuit or A/D converter.

4. Configuration of Pyroelectric Elements

Figure 4:
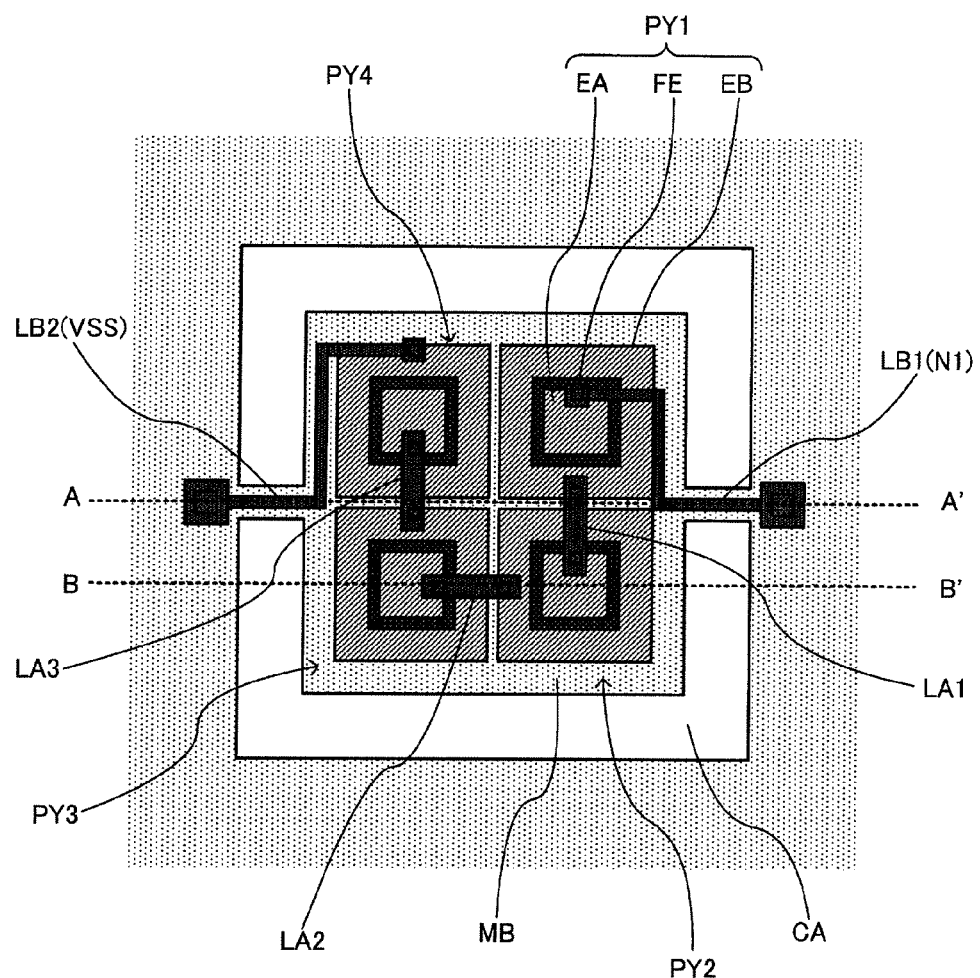
FIG. 4 is a first example of the configuration of pyroelectric elements.

FIG. 4 shows a first example of the configuration of the pyroelectric elements used in the detection device according to the present embodiment. FIG. 4 is a plan view of four serially-connected pyroelectric elements PY1 through PY4 as viewed from above. As used herein, the term "above" refers to a direction that is perpendicular to the substrate, on a side on which the pyroelectric elements, the transistor, and other components are formed (i.e., a side on which the circuit is formed). The term "below" refers to a direction opposite "above".

The first example of the configuration, shown in FIG. 4, includes first through fourth (or more broadly, n-th) pyroelectric elements PY1 through PY4, a single membrane (or more broadly, a support member) MB, a single cavity region (cavity part) CA, inter-element wiring LA1 through LA3, and wiring LB1, LB2. A member for supporting the pyroelectric elements (i.e., the support member) will hereafter be thus referred to as the membrane in the present embodiment.

Each of the pyroelectric elements PY1 through PY4 includes an upper electrode EA, a ferroelectric body (pyroelectric body) FE, and a lower electrode EB. The ferroelectric body (pyroelectric body) FE is provided between the upper electrode EA and the lower electrode EB. The pyroelectric elements PY1 through PY4 are formed on the single membrane MB (or broadly, a shared support member).

The membrane MB (support member) is, e.g., a silicon oxide film ($SiO_2$), and is used for supporting the pyroelectric elements PY1 through PY4 above the cavity region CA.

The cavity region CA is a region provided below the membrane MB, and is used for thermally isolating the pyroelectric elements PY1 through PY4 from the substrate (silicon substrate) SUB.

The inter-element wiring LA1 through LA3 is wiring for providing an electrical connection between the first through fourth pyroelectric elements PY1 through PY4, and is formed from, e.g., aluminum or another metal. Specifically, e.g., the inter-element wiring LA1 provides an electrical connection between the lower electrode EB of the first pyroelectric element PY1 and the upper electrode EA of the second pyroelectric element PY2.

Wiring LB1, LB2 is wiring for electrically connecting the pyroelectric elements PY1 through PY4 to other circuits, and is formed from, e.g., aluminum or another metal. For example, the wiring LB1 corresponds to the first connection node N1 (FIG. 1), and is wiring for providing an electrical connection between the upper electrode EA of the first pyroelectric element PY1 and the poling circuit 30. The wiring LB2 is wiring for providing an electrical connection between the lower electrode EB of the fourth pyroelectric element PY4 and the first power supply node VSS.

Figure 5A:
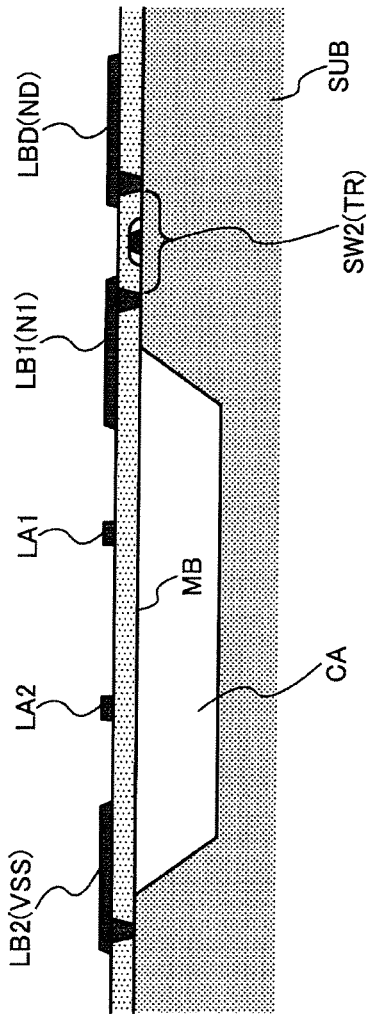
FIGS. 5A and 5B are cross-section views of the first example of the configuration of pyroelectric elements.
Figure 5B:
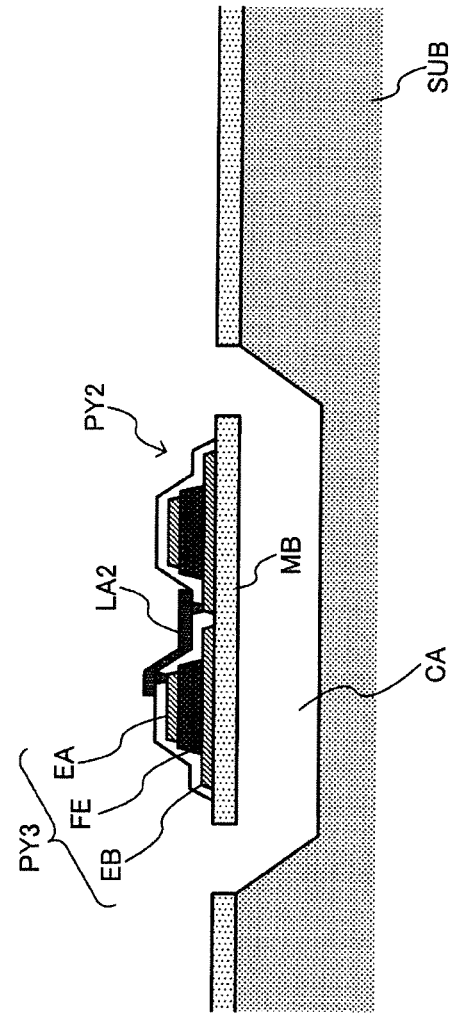

FIGS. 5A and 5B are cross-section views of the first example of the configuration of the pyroelectric elements shown in FIG. 4. FIG. 5A shows a cross-section along line A-A' in FIG. 4, and FIG. 5B shows a cross-section along line B-B' shown in FIG. 4.

As shown in FIG. 5A, one end of the wiring LB1 is connected to one end of the second switch element SW2 of the poling circuit 30. Another end of the second switch element SW2 is connected, via wiring LBD, to the detection circuit 20.

Although not shown, one end of the wiring LB1 is also connected to one end of the first switch element SW1 of the poling circuit 30, and another end of the first switch element SW1 is connected to the poling voltage supply node NP.

Each of the first and second switch elements SW1, SW2 may comprise, e.g., an MOS transistor or a similar component formed on a silicon substrate.

As shown in FIG. 5B, each of the pyroelectric elements PY1 through PY4 includes an upper electrode EA, a ferroelectric body (pyroelectric body) FE, and a lower electrode EB; and the ferroelectric body (pyroelectric body) FE is provided between the upper electrode EA and the lower electrode EB. The inter-element wiring LA2 provides an electrical connection between the lower electrode EB of the second pyroelectric element PY2 and the upper electrode EA of the third pyroelectric element PY3.

Figure 6B:
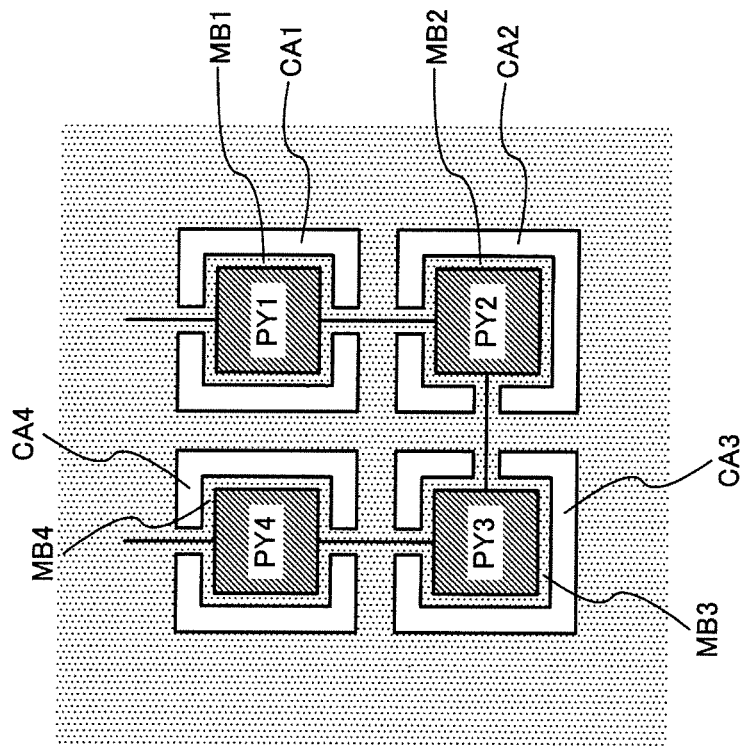
FIGS. 6A and 6B are second and third examples of the configuration of pyroelectric elements.
Figure 6A:
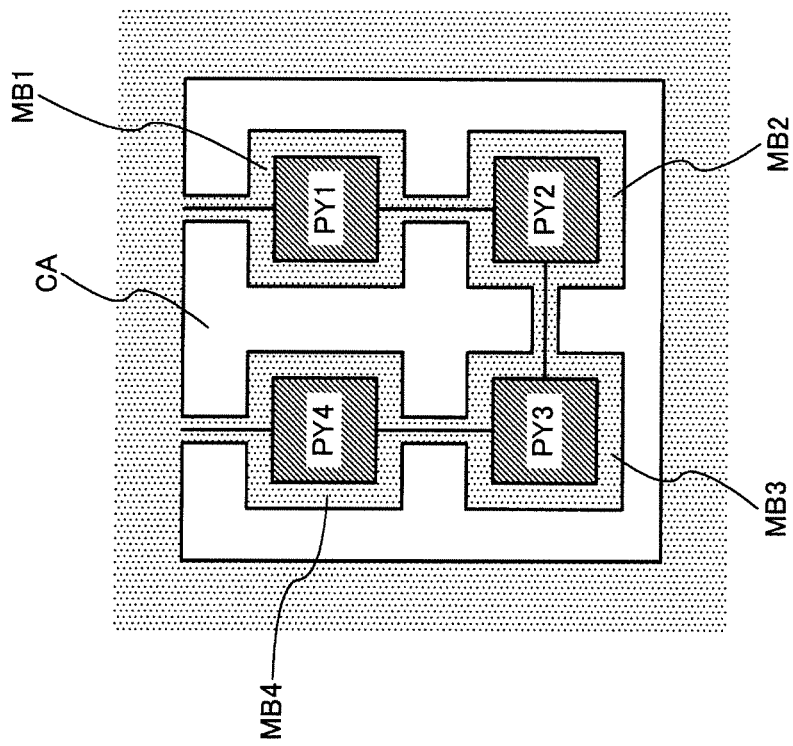

FIGS. 6A and 6B show a second and a third example of the configuration of the pyroelectric elements used in the detection device according to the present embodiment. FIGS. 6A and 6B are plan views of four serially-connected pyroelectric elements PY1 through PY4 as viewed from above.

The second example of the configuration, shown in FIG. 6A, includes first through fourth (or more broadly, n-th) membranes (or more broadly, support members) MB1 through MB4 for supporting first through fourth (or more broadly, n-th) pyroelectric elements PY1 through PY4; and a shared cavity region CA. The pyroelectric elements PY1 through PY4 are formed on the first through fourth membranes MB1 through MB4. The shared cavity region CA is provided below the first through fourth membranes MB1 through MB4.

The third example of the configuration, shown in FIG. 6B, includes first through fourth (or more broadly, n-th) membranes (or more broadly, support members) MB1 through MB4 for supporting first through fourth (or more broadly, n-th) pyroelectric elements PY1 through PY4; and first through fourth (or more broadly, n-th) cavity regions CA1 through CA4 corresponding to the first through fourth membranes MB1 through MB4. Each of the first through fourth cavity regions CA1 through CA4 is provided below the corresponding first through fourth membrane MB1 through MB4. Specifically, each of the pyroelectric elements PY1 through PY4 is formed on a separate membrane, and a separate cavity region is provided below each of the membranes.

According to the second and third examples of the configuration, the area of the membrane can be made smaller than the first example of the configuration, therefore making it possible to reduce the heat capacity. As a result, the sensitivity of the detection device can be further increased, the detection accuracy can be further enhanced, and other benefits can be obtained.

On the other hand, according to the first example of the configuration, a plurality of pyroelectric elements can be provided on a single membrane, therefore making it possible to reduce the area of a single sensor (i.e., a sensor cell). As a result, sensor cells can be arranged at high density on a sensor array in which a plurality of sensor cells are arranged as an array and other benefits can be obtained.

Example of Modification of Detection Device

Figure 7:
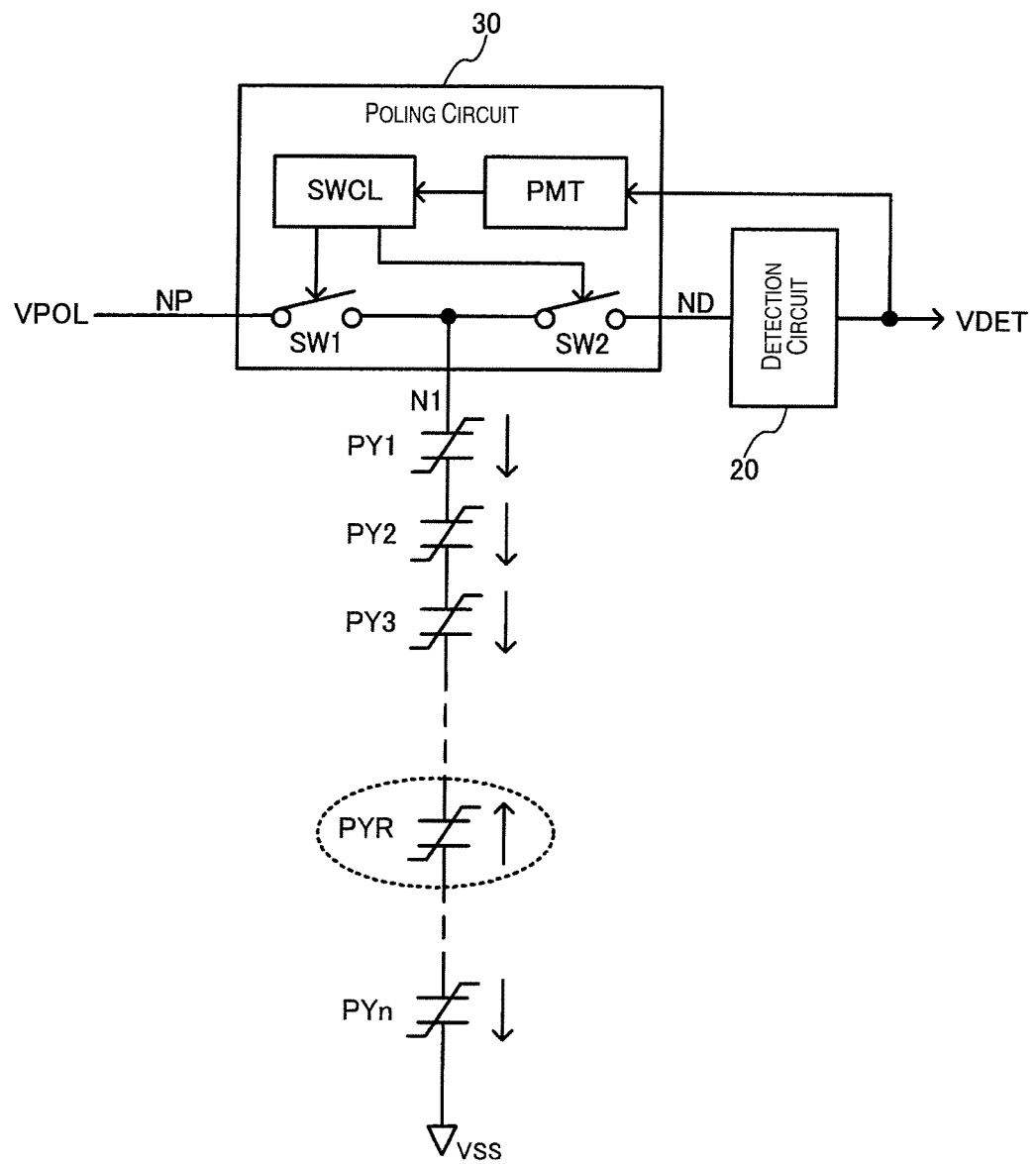
FIG. 7 is an example of modification of the detection device.

FIG. 7 shows an example of modification of the detection device according to the present embodiment. This example of modification includes at least one additional pyroelectric element PYR provided between the first connection node N1 and the first power supply node VSS, the pyroelectric element PYR having a direction of polarization that is different from that of the first through n-th pyroelectric elements PY1 through PYn. In FIG. 7, the direction of polarization of each of the pyroelectric elements is shown by an arrow. In FIG. 7, the direction of polarization of the first through n-th pyroelectric elements PY1 through PYn is shown by arrows pointing downwards. This direction of polarization is one in which, in an instance where an electrode nearer the detection node ND is an upper electrode and an electrode nearer the first power supply node VSS is a lower electrode for each of the pyroelectric elements, a negative (−) polarization charge is generated on the upper-electrode side and a positive (+) polarization charge is generated on the lower-electrode side. Also, the direction of polarization of the pyroelectric element PYR is shown by an arrow pointing upwards. This direction of polarization is one in which a positive (+) polarization charge is generated on the upper-electrode side and a negative (−) polarization charge is generated on the lower-electrode side.

The pyroelectric element PYR having a different direction of polarization is used for compensating for disturbance or change in ambient temperature. In this modified example, the detection device is arranged so that no infrared ray is incident on the pyroelectric element PYR. While detection of infrared rays is performed by the first through n-th pyroelectric elements PY1 through PYn, in an instance in which there is disturbance or change in ambient temperature, a pyroelectric current is generated in an opposite direction from the pyroelectric element PYR that has a different direction of polarization, thereby making it possible to reduce an effect of the disturbance or the change in ambient temperature.

Thus, according to the example of modification of the detection device according to the present embodiment shown in FIG. 7, providing a pyroelectric element having a different direction of polarization makes it possible to reduce an effect of disturbance or change in ambient temperature. As a result, it becomes possible to detect infrared rays in a stable and highly accurate manner without being affected by disturbance or change in ambient temperature.

In FIG. 7, a single pyroelectric element PYR having a different direction of polarization is shown. However, a plurality of pyroelectric elements having a different direction of polarization may be provided. The pyroelectric element PYR having a different direction of polarization may be provided to any node as long as the node is between the first connection node N1 and the first power supply node VSS. For example, the pyroelectric element PYR may be provided between the first and second pyroelectric elements PY1, PY2, or may be provided between the n-th pyroelectric element PYn and the first power supply node VSS.

6. Sensor Device

Figure 8A:
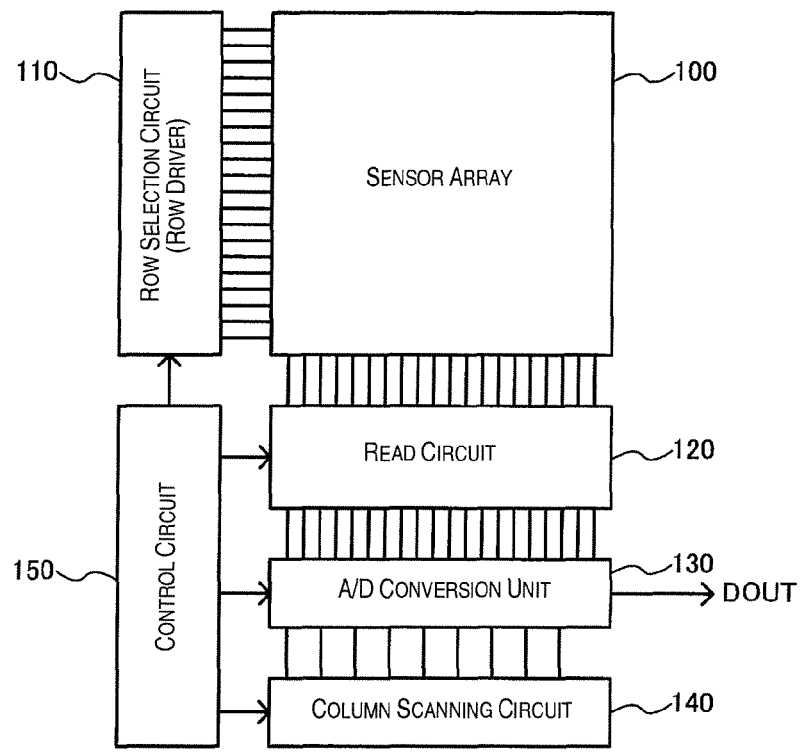
FIGS. 8A and 8B are examples of the configuration of a sensor device.

FIG. 8A shows an example of the configuration of the sensor device of the present embodiment. This sensor device includes a sensor array 100, a row selection circuit (row driver) 110, and a read circuit 120. An A/D conversion unit 130, a column scanning circuit 140, and a control circuit 150 may also be included. An infrared camera or the like used in a night vision instrument or the like, for example, can be realized through the use of the sensor device described above.

A plurality of sensor cells is arrayed (arranged) in the sensor array 100 (focal plane array). A plurality of row lines (word lines, scan lines) and a plurality of column lines (data lines) are also provided. The number of either the row lines or the column lines may be one. In a case in which there is one row line, for example, a plurality of sensor cells is arrayed in the direction of the row line in FIG. 8A (horizontal direction in the drawing). In a case in which there is one column line, a plurality of sensor cells is arrayed in the direction of the column line (vertical direction in the drawing).

Figure 8B:
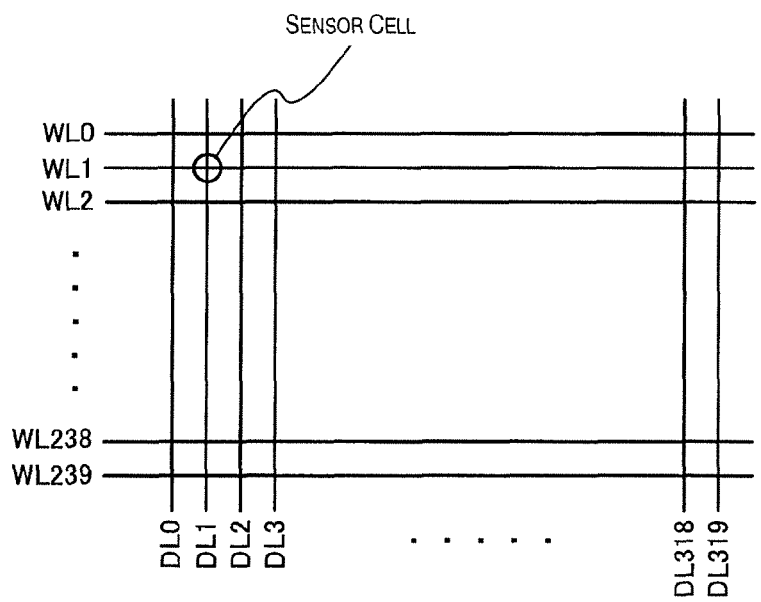

As shown in FIG. 8B, the sensor cells of the sensor array 100 are arranged (formed) in locations corresponding to the intersection positions of the row lines and the column lines. For example, a sensor cell in FIG. 8B is disposed at a location corresponding to the intersection position of word line WL1 and column line DL1. Other sensor cells are arranged in the same manner.

The row selection circuit 110 is connected to one or more row lines, and selects each row line. Using a QVGA (320×240 pixels) sensor array 100 (focal plane array) such as the one shown in FIG. 8B as an example, an operation is performed for sequentially selecting (scanning) the word lines WL0, WL1, WL2, ... WL239. In other words, signals (word selection signals) for selecting these word lines are outputted to the sensor array 100.

The read circuit 120 is connected to one or more column lines, and reads each column line. Using the QVGA sensor array 100 as an example, an operation is performed for reading detection signals (detection currents, detection charges) from the column lines DL0, DL1, DL2, ... DL319.

The A/D conversion unit 130 performs processing for A/D conversion of detection voltages (measurement voltages, attained voltages) acquired in the read circuit 120 into digital data. The A/D conversion unit 130 then outputs the A/D converted digital data DOUT. Specifically, the A/D conversion unit 130 is provided with A/D converters corresponding to each of the plurality of column lines. Each A/D converter performs A/D conversion processing of the detection voltage acquired by the read circuit 120 in the corresponding column line. A configuration may be adopted in which a single A/D converter is provided so as to correspond to a plurality of column lines, and the single A/D converter is used in time division for A/D conversion of the detection voltages of a plurality of column lines.

The column scanning circuit 140 performs an operation for sequentially selecting (scanning) the columns and outputting the A/D converted digital data of each column as time-series data. A configuration may also be adopted in which a column scanning circuit 140 is not provided, and digital data of each column are outputted in parallel.

The control circuit 150 (timing generation circuit) generates various control signals and outputs the control signals to the row selection circuit 110, the read circuit 120, the A/D conversion unit 130, and the column scanning circuit 140. A control signal for charging or discharging (reset), for example, is generated and outputted. Alternatively, a signal for controlling the timing of each circuit is generated and outputted.

Figure 9:
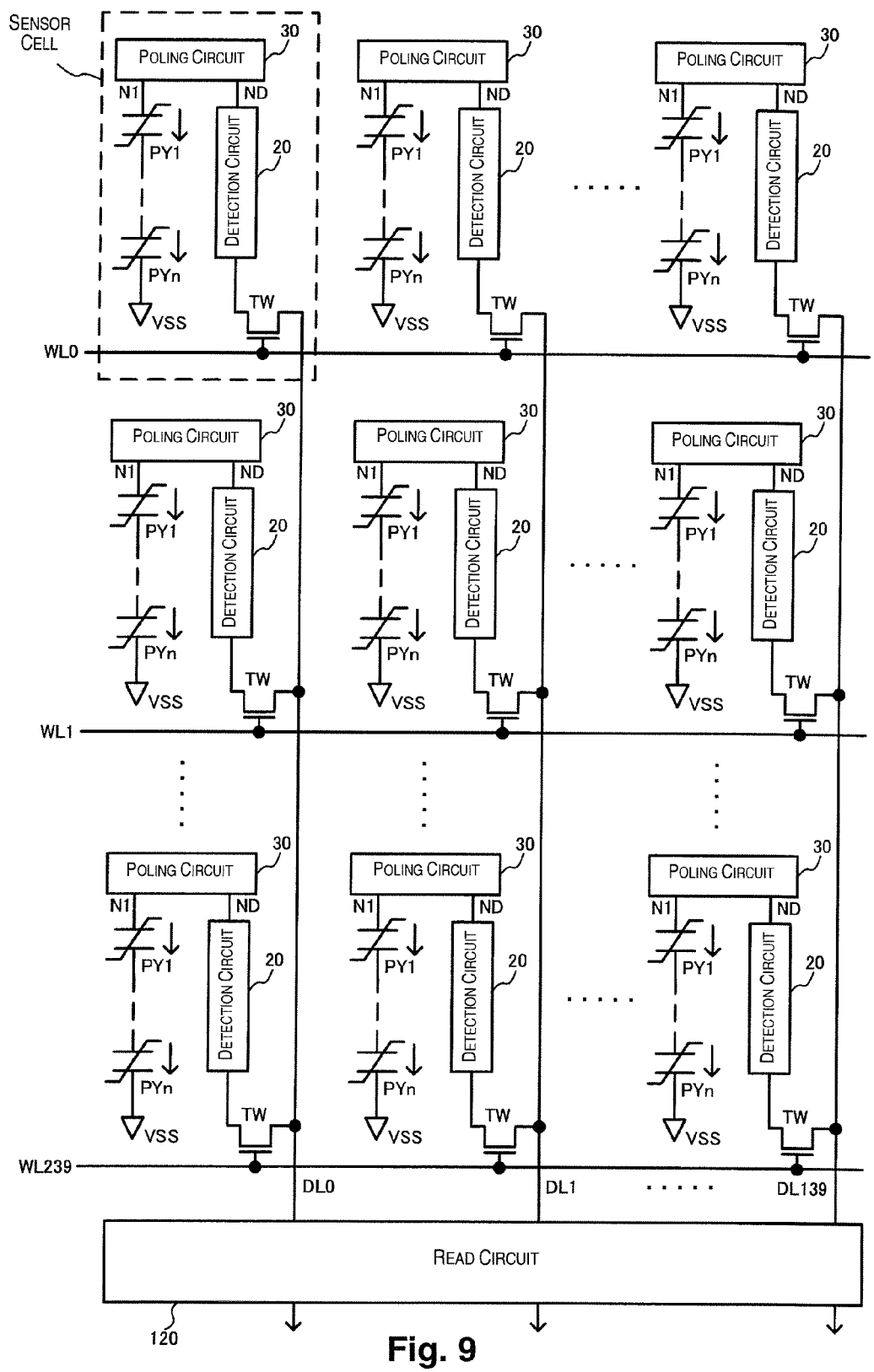
FIG. 9 is a detailed example of the configuration of a sensor array.

FIG. 9 shows an example of the detailed configuration of the sensor array 100.

Each sensor cell includes first through n-th (where n is an integer equal to 2 or greater) pyroelectric elements PY1 through PYn provided in series between a detection node ND and a first power supply node VSS; a detection circuit 20 connected to the detection node ND; and a poling circuit 30 for performing poling processing for setting the polarization directions of the first through n-th pyroelectric elements PY1 through PYn to the same direction. The polarization directions of the first through n-th pyroelectric elements PY1 through PYn are set to the same direction.

The detection signals from each of the sensor cells are read as described below. For example, in a case in which the word line WL0 is selected, a transistor TW whose gate is connected to the word line WL0 changes to the ON state. One or more sensor cells that correspond to the word line WL0 are then electrically connected to the corresponding column lines DL (DL0 through DL319). At this time, the word lines WL (WL1 through WL239) other than the word line WL0 are not selected.

Thus, a detection signal from a single or a plurality of sensor cells corresponding to row line WL0 is read for every column. Then, other row lines WL (WL1 through WL239) are selected in turn, and a detection signal is read from each of the sensor cells in a similar manner to above.

According to a sensor device of the present embodiment, serially connecting n pyroelectric elements having identical directions of polarization makes it possible to obtain a detection signal whose voltage level is n times greater than that of a detection signal that is obtained from one pyroelectric element. As a result, the detection sensitivity of a sensor device can be increased without changing the material used for, or the film thickness of, the pyroelectric body (ferroelectric body), therefore making it possible to obtain, e.g., a high-sensitivity infrared camera or a similar device.

7. Electronic Apparatus

Figure 10:
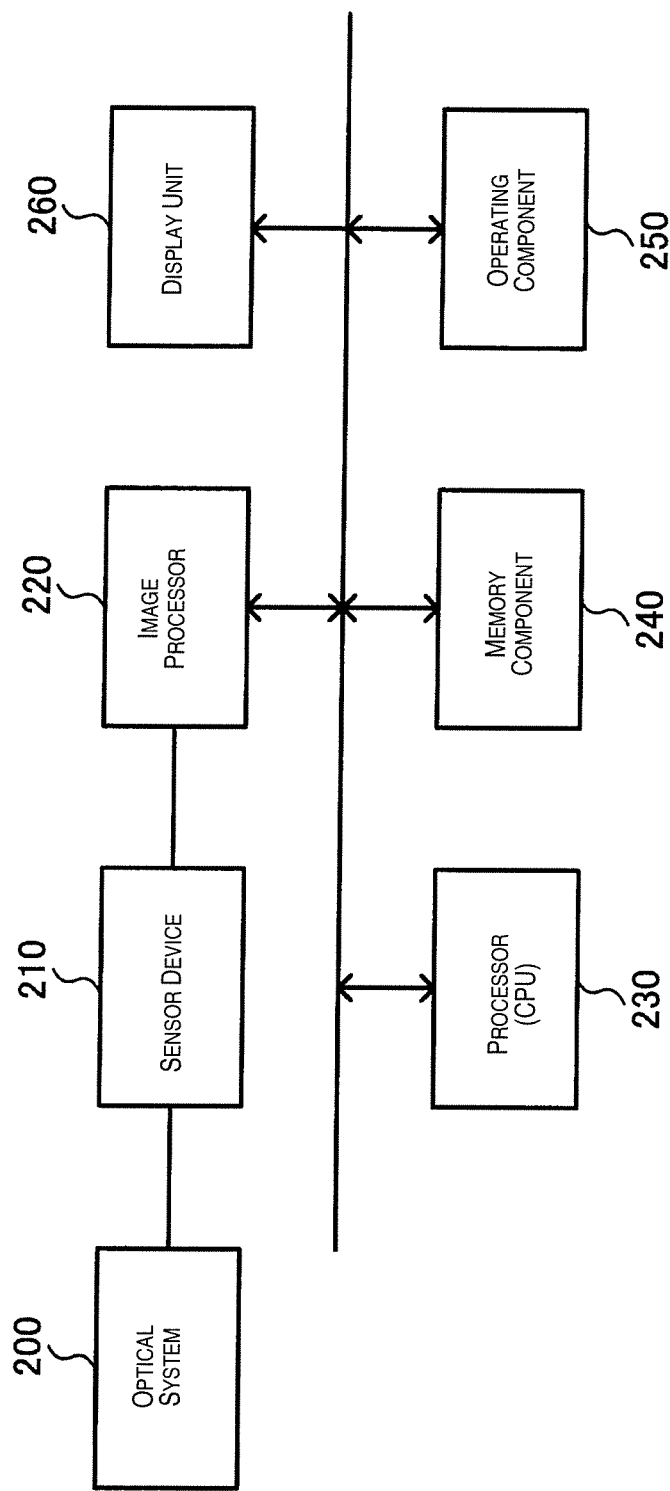
FIG. 10 is an example of the configuration of an electronic apparatus comprising a sensor device.

FIG. 10 shows an example of the configuration of an electronic apparatus which includes the sensor device of the present embodiment. The electronic apparatus is an infrared camera, for example, and includes an optical system 200, a sensor device 210, an image processor 220, a processor 230, a memory component 240, an operating component 250, and a display unit 260. The electronic apparatus of the present embodiment is not limited to the configuration shown in FIG. 10, and various modifications thereof are possible, such as omitting some elements (e.g., the optical system, operating component, display unit, or other components) or adding other elements.

The optical system 200 includes one or a plurality of lenses, for example, a drive unit for driving the lenses, and other components. Such operations as forming an image of an object on the sensor device 210 are also performed. Focusing and other adjustments are also performed as needed.

The sensor device 210 is the device described using FIG. 8A and other drawings, and performs image capture processing of an object image. The image processor 220 performs image correction processing and various other types of image processing on the basis of digital image data (pixel data) from the sensor device 210.

The processor 230 controls the electronic apparatus as a whole and controls each block within the electronic apparatus. The processor 230 is realized by a CPU or the like, for example. The memory component 240 stores various types of information and functions as a work area for the processor 230 or the image processor 220, for example. The operating component 250 serves as an interface for operation of the electronic apparatus by a user, and is realized by various buttons, a GUI (graphical user interface) screen, or the like, for example. The display unit 260 displays the image acquired by the sensor device 210, the GUI screen, and other images, for example, and is realized by a liquid crystal display, an organic EL display, or another type of display or projection-type display apparatus or the like.

The present embodiment can be applied to an infrared camera which uses an FPA (Focal Plane Array) or to an electronic apparatus which uses an infrared camera. Possible examples of electronic apparatus in which an infrared camera is applied include night vision instruments for capturing an image of an object at night, thermography instruments for acquiring a temperature distribution of an object, intrusion detection instruments for detecting intrusion by a person, analysis instruments (measurement instruments) for analyzing (measuring) physical information of an object, security instruments for detecting fire or heat, and FA (Factory Automation) instruments provided in a factory or the like. By applying a night vision instrument as an automobile instrument, the outline of a person or other object at night can be detected and displayed during vehicle travel. Application in a thermography instrument enables use in influenza quarantine and the like.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A detection device comprising:
a plurality of pyroelectric elements including a first pyroelectric element through an n-th pyroelectric element serially provided between a detection node and a first power supply node with n being an integer equal to or greater than 2, each of the first pyroelectric element through the n-th pyroelectric element having a direction of polarization that is set to the same direction;
a detection circuit connected to the detection node; and
a poling circuit configured to perform a poling process, the poling circuit including a first switch element provided between a poling voltage supply node and a first connection node disposed at one end of the first pyroelectric element, and a second switch element provided between the first connection node and the detection node.

2. The detection device according to claim 1, wherein
in the poling circuit, the direction of polarization of each of the first pyroelectric element through the n-th pyroelectric element is set to the same direction.

3. The detection device according to claim 2, wherein
the poling circuit is configured to apply, to the first connection node, a poling voltage for causing the first pyroelectric element through the n-th pyroelectric element to become polarized in the same direction.

4. The detection device according to claim 3, wherein
the poling circuit is configured to set the first switch element to an OFF state and the second switch element to an ON state during a detection period, and to set the first switch element to an ON state and the second switch element to an OFF state during a period of the poling process.

5. The detection device according to claim 4, further comprising
at least one additional pyroelectric element provided between the first connection node and the first power supply node, the additional pyroelectric element having a direction of polarization that is different from that of the first pyroelectric element through the n-th pyroelectric element.

6. The detection device according to claim 4, wherein
the poling circuit includes a poling monitor circuit configured to monitor whether or not the poling process has been performed in a normal manner.

7. The detection device according to claim 4, further comprising
a shared support member supporting the first pyroelectric element through the n-th pyroelectric element, with the first pyroelectric element through the n-th pyroelectric element being formed on the shared support member.

8. The detection device according to claim 4, further comprising
a plurality of support members including a first support member through an n-th support member supporting the first pyroelectric element through the n-th pyroelectric element, respectively, with the first pyroelectric element through the n-th pyroelectric element being formed on the first support member through the n-th support member, respectively.

9. The detection device according to claim 8, further comprising
a shared cavity region shared between the first support member through the n-th support member, with the shared cavity region being provided below the first support member through the n-th support member.

10. The detection device according to claim 8, further comprising
a plurality of cavity regions including a first cavity region through an n-th cavity region, respectively corresponding to the first support member through the n-th support member, with the first cavity region through the n-th cavity region being provided below the first support member through the n-th support member, respectively.

11. A sensor device comprising:
a sensor array having a plurality of sensor cells with each of the sensor cells including
a plurality of pyroelectric elements including a first pyroelectric element through an n-th pyroelectric element serially provided between a detection node and a first power supply node with n being an integer equal to or greater than 2, each of the first pyroelectric element through the n-th pyroelectric element having a direction of polarization that is set to the same direction;
a detection circuit connected to the detection node; and
a poling circuit configured to perform a poling process, in which the direction of polarization of each of the first pyroelectric element through the n-th pyroelectric element is set to the same direction, the poling circuit including a first switch element provided between a connection node and a poling voltage supply node to which a poling voltage is supplied, and a second switch element provided between the connection node and the detection node;
one or more row lines;
one or more column lines;
a row selection circuit connected to the one or more row lines; and
a read circuit connected to the one or more column lines.

12. An electronic apparatus including the sensor device according to claim 11.

13. A detection device comprising:
a plurality of pyroelectric elements electrically connected in series between a detection node and a power supply node;
a detection circuit configured to detect a current in the pyroelectric elements, the detection circuit being connected to the detection node; and
a poling circuit configured to perform a poling process, in which a direction of polarization of each of the pyroelectric elements is set to the same direction, the poling circuit including a first switch element provided between a connection node and a poling voltage supply node to which a poling voltage is supplied, and a second switch element provided between the connection node and the detection node.

14. The detection device according to claim 13, wherein
the poling circuit is configured to set the first switch element to an OFF state and the second switch element to an ON state during a detection period, and to set the first switch element to an ON state and the second switch element to an OFF state during a period of the poling process.

15. The detection device according to claim 14, further comprising
an additional pyroelectric element provided between the connection node and the power supply node, the additional pyroelectric element having a direction of polarization that is different from that of the pyroelectric elements.

16. The detection device according to claim 14, wherein
the poling circuit includes a poling monitor circuit configured to monitor whether or not the poling process has been performed in a normal manner.

17. The detection device according to claim 13, wherein
the poling circuit is configured to apply, to a connection node disposed at one end of an end one of the pyroelectric elements, a poling voltage for causing the pyroelectric elements to become polarized in the same direction.

18. A sensor device including the detection device according to claim 13.

19. An electronic apparatus including the sensor device according to claim 18.

* * * * *